United States Patent
Lin et al.

(10) Patent No.: US 11,827,293 B2
(45) Date of Patent: Nov. 28, 2023

(54) REAL-TIME ESTIMATION OF ACHIEVABLE ANGLE, VELOCITY, AND ACCELERATION CAPABILITIES OF STEERING ACTUATOR

(71) Applicant: GM GLOBAL TECHNOLOGY OPERATIONS LLC, Detroit, MI (US)

(72) Inventors: Wen-Chiao Lin, Rochester Hills, MI (US); Ibrahim A. Badiru, Novi, MI (US); Alexander M. Allan, Howell, MI (US); Bo Yu, Novi, MI (US); Qi Zhang, Beverly Hills, MI (US); Christopher C. Au, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 237 days.

(21) Appl. No.: 17/171,005

(22) Filed: Feb. 9, 2021

(65) Prior Publication Data
US 2022/0250673 A1    Aug. 11, 2022

(51) Int. Cl.
*B62D 5/04*       (2006.01)
*B62D 3/12*       (2006.01)

(52) U.S. Cl.
CPC ............. *B62D 5/049* (2013.01); *B62D 3/126* (2013.01); *B62D 5/0484* (2013.01); *B62D 5/0487* (2013.01)

(58) Field of Classification Search
CPC ...... B62D 5/049; B62D 3/126; B62D 5/0484; B62D 5/0487; B62D 15/025; B62D 5/0481; B62D 5/0457; B62D 5/0466; B62D 5/00; B62D 5/04; B62D 5/0409; B62D 5/0421;
(Continued)

(56) References Cited

U.S. PATENT DOCUMENTS 10,549,773 B2   2/2020  Lin et al.
2017/0101126 A1  4/2017  Kim
2018/0056986 A1* 3/2018  Wang .............. B60W 30/18145
(Continued)

FOREIGN PATENT DOCUMENTS

CN      105579324 A    5/2016
CN      108016431 A    5/2018
(Continued)

OTHER PUBLICATIONS

Chinese Office Action for Chinese Application No. CN202111532602.8 dated Jun. 1, 2023.

*Primary Examiner* — Abby Y Lin
*Assistant Examiner* — Dylan Brandon Mooney (57) ABSTRACT

A system comprises a processor and a memory storing instructions which when executed by the processor configure the processor to estimate a rack force for a steering system of a vehicle based on current driving and environmental conditions and estimate a health of an actuator of the steering system of the vehicle. The instructions configure the processor to estimate maximum achievable angle, velocity, and acceleration for the actuator of the steering system based on the estimated rack force and the estimated health of the actuator. The instructions configure the processor to provide to the steering system a path planned for the vehicle based on the estimated maximum achievable angle, velocity, and acceleration for the actuator of the steering system.

14 Claims, 6 Drawing Sheets

(58) Field of Classification Search
CPC .... B62D 5/046; B62D 5/0463; B62D 5/0493; B60G 2800/96
See application file for complete search history.

(56) References Cited

U.S. PATENT DOCUMENTS

| | | | |
|---|---|---|---|
| 2019/0135331 A1* | 5/2019 | Pramod | H02P 29/032 |
| 2020/0017139 A1* | 1/2020 | Ramanujam | B62D 5/0481 |
| 2020/0023891 A1 | 1/2020 | Lin et al. | |
| 2020/0255059 A1* | 8/2020 | Guilemond | B62D 5/0481 |
| 2021/0342500 A1* | 11/2021 | George | G06F 30/15 |

FOREIGN PATENT DOCUMENTS

| | | |
|---|---|---|
| CN | 109955898 A | 7/2019 |
| CN | 110712676 A | 1/2020 |
| CN | 111688661 A | 9/2020 |

\* cited by examiner

REAL-TIME ESTIMATION OF ACHIEVABLE ANGLE, VELOCITY, AND ACCELERATION CAPABILITIES OF STEERING ACTUATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to real-time estimation of achievable angle, velocity, and acceleration capabilities of a steering actuator.

The Society of Automotive Engineers (SAE) defines six levels (Levels 0-5) of autonomous driving. In SAE Level 2-5 autonomous vehicles, driving systems perform path planning, that is, plan a path for a vehicle to follow. An electrical power steering (EPS) system in autonomous vehicles is controlled based on the path planning. For example, the autonomous driving system of a first vehicle that is trailing a second vehicle may plan a path for the first vehicle that allows the first vehicle to pass the second vehicle. The first vehicle's autonomous driving system indicates a predicted path capability for the first vehicle, which is then be used to control the first vehicle's EPS to execute the planned passing operation. However, if the path is over-predicted, the actual path of the first vehicle may cause the first vehicle to collide with the second vehicle. Conversely, if the path is under-predicted, the planned path of the first vehicle may be too conservative and cause a maneuverability problem or falsely limit the path such that the first vehicle cannot pass the second vehicle even if it is capable of passing the second vehicle.

SUMMARY

A system comprises a processor and a memory storing instructions which when executed by the processor configure the processor to estimate a rack force for a steering system of a vehicle based on current driving and environmental conditions and estimate a health of an actuator of the steering system of the vehicle. The instructions configure the processor to estimate maximum achievable angle, velocity, and acceleration for the actuator of the steering system based on the estimated rack force and the estimated health of the actuator. The instructions configure the processor to provide to the steering system a path planned for the vehicle based on the estimated maximum achievable angle, velocity, and acceleration for the actuator of the steering system.

In another feature, the instructions configure the processor to provide the path to the steering system in response to an angle, a velocity, and an acceleration for executing the path being within the estimated maximum achievable angle, velocity, and acceleration.

In another feature, the instructions configure the processor to cause the steering system to execute the path in response to an angle, a velocity, and an acceleration for executing the path being within the estimated maximum achievable angle, velocity, and acceleration.

In another feature, before providing the path to the steering system, the instructions configure the processor to modify the path to bring an angle, a velocity, and an acceleration for the actuator in conformity with the estimated maximum achievable angle, velocity, and acceleration.

In another feature, the instructions configure the processor to calculate the rack force based on the current driving and environmental conditions used to estimate the rack force; and to verify accuracy of the estimated rack force by comparing the estimated rack force to the calculated rack force.

In another feature, the instructions configure the processor to provide an indication based on the accuracy to check one or more sensors.

In another feature, the instructions configure the processor to provide an indication based on the accuracy to update a model used to estimate the rack force.

In another feature, the instructions configure the processor to obtain a first value for the rack force from a lookup table based on the nominal driving and environmental conditions, obtain an adjustment factor from a model based on the current driving and environmental conditions, and estimate the rack force by multiplying the first value for the rack force by the adjustment factor.

In another feature, the instructions configure the processor to calculate a first set of rack forces at a first set of vehicle speeds and a first set of steering data, estimate a second set of rack forces for a second set of vehicle speeds and a second set of steering data by interpolating the first set of rack forces, and generate the lookup table including the first and second sets of vehicle speeds.

In another feature, the instructions configure the processor to train the model to calculate rack forces at different driving and environmental conditions, and generate the adjustment factor by comparing a first rack force calculated at the current driving and environmental conditions to a second rack force calculated at nominal driving and environmental conditions.

In still other features, a method comprises estimating a rack force for a steering system of a vehicle based on current driving and environmental conditions, and estimating a health of an actuator of the steering system of the vehicle. The method further comprises estimating maximum achievable angle, velocity, and acceleration for the actuator of the steering system based on the estimated rack force and the estimated health of the actuator. The method further comprises providing to the steering system a path planned for the vehicle based on the estimated maximum achievable angle, velocity, and acceleration for the actuator of the steering system.

In another feature, the method further comprises providing the path to the steering system in response to an angle, a velocity, and an acceleration for executing the path being within the estimated maximum achievable angle, velocity, and acceleration.

In another feature, the method further comprises executing the path using the steering system in response to an angle, a velocity, and an acceleration for executing the path being within the estimated maximum achievable angle, velocity, and acceleration.

In another feature, the method further comprises before providing the path to the steering system, modify the path to bring an angle, a velocity, and an acceleration for the actuator in conformity with the estimated maximum achievable angle, velocity, and acceleration.

In another feature, the method further comprises calculating the rack force based on the current driving and environmental conditions used to estimate the rack force, and verifying accuracy of the estimated rack force by comparing the estimated rack force to the calculated rack force.

In another feature, the method further comprises providing an indication based on the accuracy to check one or more sensors.

In another feature, the method further comprises providing an indication based on the accuracy to update a model used to estimate the rack force.

In another feature, the method further comprises obtaining a first value for the rack force from a lookup table based on the nominal driving and environmental conditions, obtaining an adjustment factor from a model based on the current driving and environmental conditions, and estimating the rack force by multiplying the first value for the rack force by the adjustment factor.

In another feature, the method further comprises calculating a first set of rack forces at a first set of vehicle speeds and a first set of steering data, estimating a second set of rack forces for a second set of vehicle speeds and a second set of steering data by interpolating the first set of rack forces, and generating the lookup table including the first and second sets of vehicle speeds.

In another feature, the method further comprises training the model to calculate rack forces at different driving and environmental conditions, and generate the adjustment factor by comparing a first rack force calculated at the current driving and environmental conditions to a second rack force calculated at nominal driving and environmental conditions.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure provides a method to estimate steering wheel angle/velocity/acceleration capabilities for an autonomous driving system of a vehicle in real-time. Throughout the present disclosure, the terms rack force and torque are used by referring to a rack and pinion based steering system and by using an electrical power steering (EPS) system used with the rack and pinion based steering system. However, the present disclosure is not so limited. Rather, the rack and pinion based steering system and the EPS system are used as illustrative examples only. The teachings of the present disclosure are equally applicable to other type of steering systems and steering control systems. For example, the teachings can be applied to a steering system comprising two independent steering actuators respectively used to drive the two front (or back) wheels without a rack assembly between them. Further, unlike a rotating motor used with the rack and pinion based steering system, the independent steering actuators may be linear actuators. Accordingly, the term torque, which is used with reference to the motor throughout the present disclosure, may be replaced by the term force.

The method of the present disclosure uses modeled health-based steering motor capability and steering rack force estimation under a variety of vehicle operating conditions. The maximum steering wheel angle, velocity, and acceleration that a steering system can provide depends on various factors such as the vehicle's operating conditions, environmental conditions, and health of the steering motor. Currently, path planning in autonomous vehicles does not take into account the vehicle's current driving conditions, such as temperature, vehicle loading, tire pressure, etc. The method of the present disclosure receives real-time feedback about the vehicle's current driving conditions so that the autonomous driving system can optimize and revise the planned path to align with steering system capabilities in real-time.

As explained below in detail, the method considers these real-time parameters to calculate the steering wheel angle/velocity/acceleration capabilities instead of using a conservative/physical model. Therefore, the method can increase the accuracy of path planning trajectory and reduce error. The method uses a trained model such as a neural network and a lookup table to account for external factors in the vehicle's operating environment, such as ambient temperature, tire pressure, vehicle mass, surface friction coefficient, etc.

Specifically, the method estimates the steering wheel angle (SWA), steering wheel angle gradient (SWG), and steering wheel angle acceleration (SWAA) capabilities in real-time by considering health-based torque capability of the steering motor and rack force estimations. The method uses calculated results to check or revise the planned path/trajectory. The method integrates data-driven models (e.g., a lookup table and/or a neural network) to estimate the rack force by considering various vehicle conditions in real time.

The method also checks the accuracy of the estimated rack force and provides alerts when the accuracy starts to degrade.

The prior art does not consider the real-time vehicle conditions to generate the achievable SWA, SWG, and SWAA capabilities. The prior art also does not consider torque capability of the steering motor (or force of a linear actuator) to generate the achievable SWA, SWG, and SWAA in order to check and plan path trajectories. In contrast, by accounting for these factors, the method of the present disclosure improves the technical field of autonomous driving generally, and the technical field of path planning and path execution by steering systems in autonomous vehicles particularly. These and other features of the present disclosure are described below in further detail.

The present disclosure is organized as follows. A system for real-time estimation of achievable angle, velocity, and acceleration capabilities of a steering actuator according to the present disclosure is shown and described with reference to FIG. 1. A method for real-time estimation of achievable angle, velocity, and acceleration capabilities of a steering actuator according to the present disclosure is shown and described with reference to FIG. 2. Subsequently, various specific features of the method are shown and described with reference to FIGS. 3-9.

For example, a method of estimating a rack force in real-time using a lookup table and a trained model is shown and described with reference to FIG. 3. A method of building the lookup table by calculating a rack force under normal driving conditions is shown and described with reference to FIG. 4. A method of training a model (e.g., a neural network) for providing an adjustment factor that can be applied to the rack force calculated under normal conditions to estimate the rack force in real-time is shown and described with reference to FIG. 5.

Subsequently, methods for calculating maximum achievable SWA, SWAA, and SWG are respectively shown and described with reference to FIGS. 6-8. Thereafter, a method of checking a planned path/trajectory in real-time is shown and described with reference to FIG. 9. Finally, a method of checking the accuracy of the rack force estimation is shown and described with reference to FIG. 10.

Figure 1:
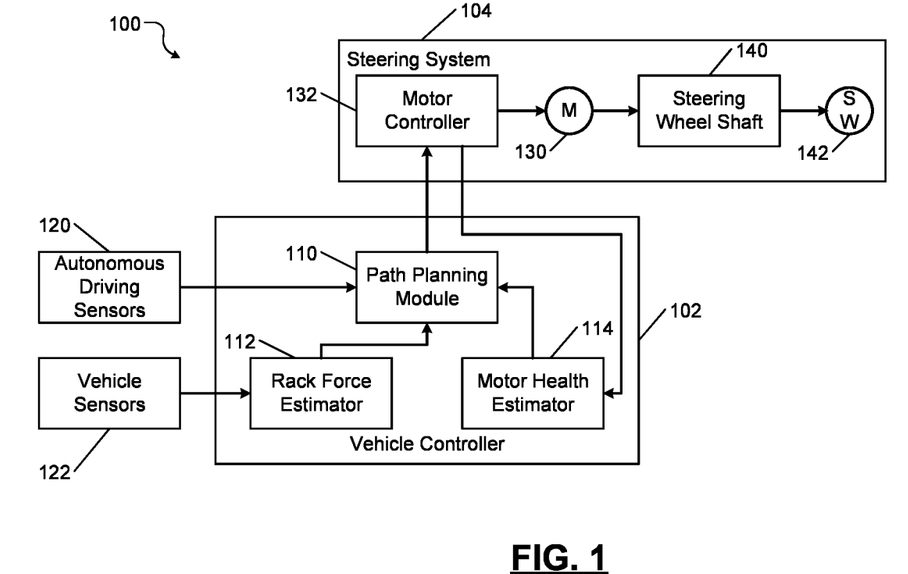
FIG. 1 shows a functional block diagram of a system for real-time estimation of achievable angle, velocity, and acceleration capabilities of a steering actuator according to the present disclosure.

FIG. 1 shows a system 100 for real-time estimation of achievable angle, velocity, and acceleration capabilities of a steering actuator according to the present disclosure. The system 100 is implemented in an autonomous vehicle or any SAE Level 2-5 vehicle, and comprises a vehicle controller 102 and a steering system 104. In some examples, the vehicle controller 102 and the steering system 104 are part of a driving control system (e.g., an autonomous driving system) of the vehicle. In some examples, the vehicle controller 102 may be at least partly implemented in a cloud and may communicate with the steering system 104 in the vehicle via a distributed communication system such as the Internet, a cellular network, and so on.

The vehicle controller 102 comprises a path planning module 110, a rack force estimator 112, and a motor health estimator 114. In some examples, the motor health estimator 114 may instead be included in the steering system 104 as explained below. The system 100 further comprises a plurality of autonomous driving sensors (hereinafter the first sensors) 120 and a plurality of vehicle sensors (hereinafter the second sensors) 122. The vehicle controller 102 receives data from the first and second sensors 120, 122.

For example, the first sensors 120 can include radar, Lidar, a laser scanner, one or more cameras, a global positioning system (GPS) receiver, an inertial navigation system (INS), an inertial measurement unit (IMU), and so on. The second sensors 122 can sense a variety of vehicle and environmental parameters. For example, the second sensors 122 can include suspension sensors, tire pressure sensors, axle load sensors, vehicle speed sensors, ambient temperature sensors, traction sensors, and so on.

The steering system 104 includes an electrical power steering (EPS) system and comprises a motor 130 and a motor controller 132. Accordingly, the steering system 104 may also be called the EPS 104. The motor 130 is mounted to a shaft 140 of a steering wheel 142. The shaft 140 of the steering wheel 142 is connected to a rack assembly via a pinion at a distal end of the shaft 140. In some examples, the motor 130 can also be mounted directly on the rack assembly. The rack and pinion are ubiquitous components of steering systems and are therefore neither shown nor described for brevity.

While not shown, in some examples, the steering system 104 may include two independent steering actuators respectively used to drive the two front (or back) wheels without a rack assembly between them. Further, instead of the motor 130 used with the rack and pinion based steering system, the independent steering actuators may be linear actuators, which are controlled and operated by the motor controller 132.

The path planning module 110 plans the path for the steering system 104 to follow based on the inputs from the first sensors 120. The motor controller 132 receives the planned path from the path planning module 110. The motor controller 132 controls the motor 130 that drives the shaft 140 of the steering wheel 142 according to the planned path received from the path planning module 110. In some examples, the motor health estimator 114 may be included in the motor controller 132 instead of in the vehicle controller 102.

The rack force estimator 112 estimates a rack force, which is a net force generated by tire movements on a steering rack of the vehicle. The rack force is determined based on various factors such as, for example, tire-road angle, a surface profile of the road, and the speed of the vehicle. The rack force estimator 112 estimates the rack force as described below with reference to FIGS. 3-5. The rack force estimator 112 provides the estimates of the rack force to the path planning module 110 in real-time.

The motor health estimator 114 estimates the health of the motor 130 based on data collected by the motor controller 132. For example, the torque capability of the motor 130 can change over time. Further, the torque capability of the motor 130 varies with temperature. The motor health estimator 114 estimates the health of the motor 130 by monitoring a shift in the motor capability data (e.g., a motor capability curve) provided by a motor manufacturer. The motor health estimator 114 provides the health estimate of the motor 130 to the path planning module 110 in real-time. The health estimate is in the form of a torque capability curve of the motor 130. For example, the motor health estimator 114 outputs a graph shown in FIG. 6, which shows the rack force capability of the motor 130 in terms of the motor's torque capability (output) as a function of SWG (input).

The path planning module 110 plans the path based on the rack force estimate received from the rack force estimator 112 and the health estimate of the motor 130 received from the motor health estimator 114 as explained below in detail with reference to FIG. 2. For example, the path planning module 110 checks in real time if the planned path is within constraints generated based on the rack force and the motor health estimates. The checking prevents the planned path from being over- or under-predicted.

The path planning module 110 provides the planned path to the motor controller 132 for execution if the planned path is within the constraints. The path planning module 110 can also revise (e.g., adjust or fine tune) the planned path in real-time based on the rack force and the motor health estimates. The path planning module 110 can also use the rack force and the motor health estimates for planning future paths and trajectories of the vehicle.

The path planning module 110 estimates maximum achievable steering wheel angle (SWA), steering wheel angle gradient (SWG), and steering wheel angle acceleration (SWAA) capabilities of the steering system 104 in real-time based on the rack force and the motor health estimates. The motor controller 132 executes the planned path provided by the path planning module 110, and the motor 130 controls the steering wheel 142 according to the planned path executed by the motor controller 132. Additionally, while not shown, many other subsystems of the vehicle 106 coordinate with the steering system 104 to execute the planned path. Non-limiting examples of the subsystems include braking subsystem, propulsion subsystem, etc.

The operation of the system 100 is now described in further detail with reference to FIGS. 2-10. Various methods are described below with reference to FIGS. 2-10. Throughout the following disclosure, the term control denotes one or more of the vehicle controller 102 and/or the motor controller 132 depending on the functionality described. In some examples, the vehicle controller 102 and the motor controller 132 can be implemented using a single controller.

Figure 2:
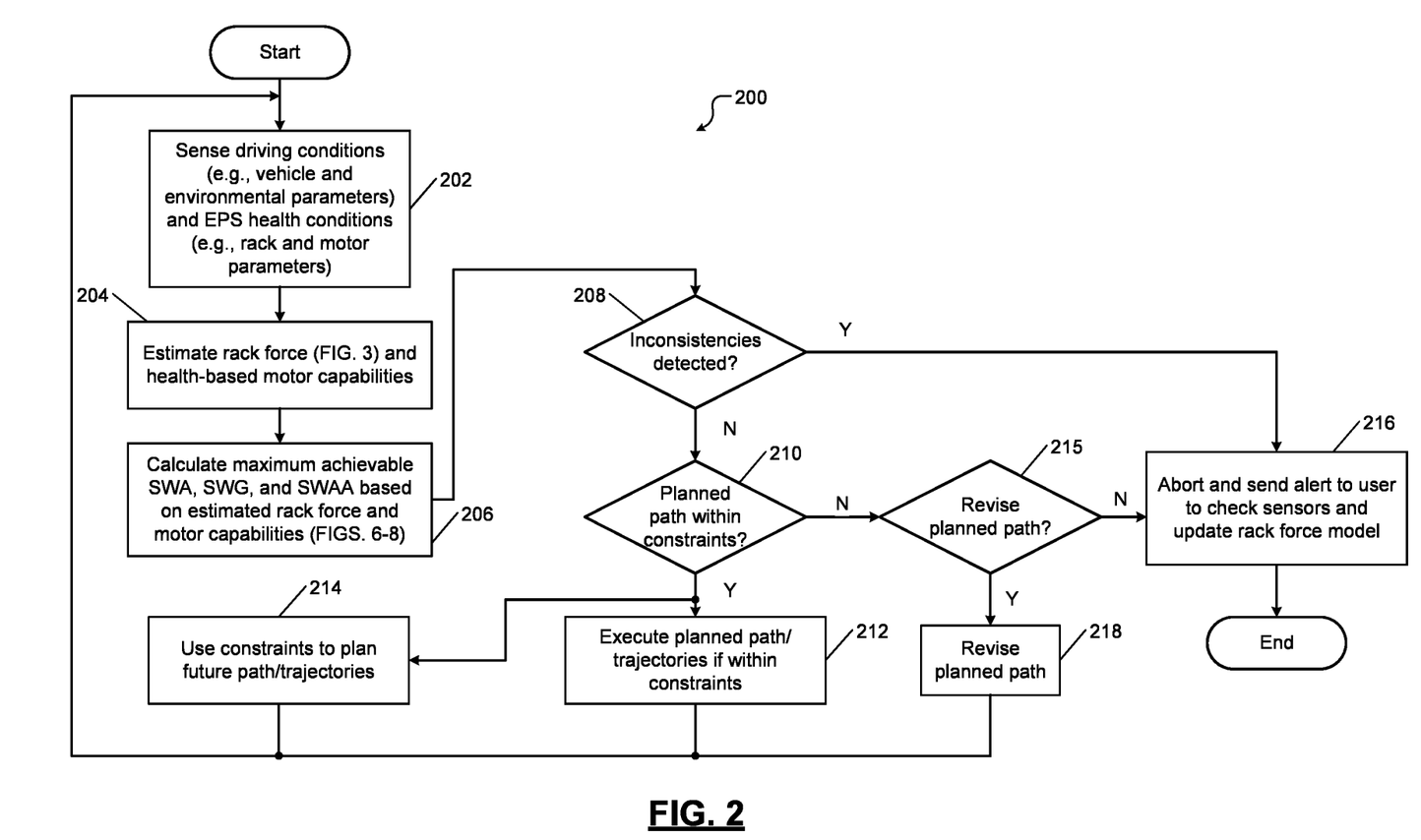
FIG. 2 shows a flowchart of a method for real-time estimation of achievable angle, velocity, and acceleration capabilities of a steering actuator according to the present disclosure.

FIG. 2 shows a method 200 for real-time estimation of achievable angle, velocity, and acceleration capabilities of a steering actuator according to the present disclosure. For example, the method 200 is performed partly by the vehicle controller 102 and partly by the motor controller 132. The method 200 can be repeated at a predetermined calibrated interval to check and/or plan path/trajectory in immediate time horizon. The method 200 can also be used to check a relatively longer term planned path/trajectory using its profile and to revise (i.e., alter or adjust) the longer term planned path/trajectory if and as needed.

At 202, control (e.g., the vehicle controller 102) senses or receives driving conditions (e.g., vehicle and environmental parameters) and EPS health conditions (e.g., rack and motor parameters). For example, the EPS health conditions may indicate the health of the entire EPS (i.e., the entire steering system 104, which may also include the motor health estimator 114 in some examples as described above). For example, the vehicle and environmental parameters can include data received from the second sensors 122. For example, the data received from the second sensors 122 can include (but is not limited to) tire pressure, ambient temperature, front axle load, road surface mu (coefficient of friction), and so on. For example, the rack and motor parameters can include data received from the motor controller 132. For example, the data received from the motor controller 132 can include (but is not limited to) rack internal friction, the health (e.g., torque capability) of the motor 130, power supply voltage for the motor controller 132 and the motor 130, and so on.

At 204, based on the received data, control (e.g., the vehicle controller 102) estimates the rack force and health-based capabilities of the motor 130. The rack force estimation is described in further detail with reference to FIG. 3.

The health-based motor capabilities estimation includes estimating a shift or deviation in the motor's torque capabilities, for example.

At 206, based on the estimated rack force and motor capabilities, control (e.g., the vehicle controller 102) calculates maximum achievable steering wheel angle (SWA), steering wheel angle gradient (SWG), and steering wheel angle acceleration (SWAA). These calculations are described in further detail with reference to FIGS. 6-8.

At 208, control (e.g., the vehicle controller 102) determines if any of the calculated maximum achievable SWA, SWG, and SWAA are inconsistent as described in detail with reference to FIGS. 6-8. If no inconsistencies are detected in the calculations, at 210, control checks if the planned path/trajectories (planned based on inputs from the first sensors 120) fall within the constraints set by the calculated maximum achievable SWA, SWG, and SWAA.

At 212, control (e.g., the motor controller 132) executes the planned path/trajectories if the planned path/trajectories fall within the constraints set by the calculated maximum achievable SWA, SWG, and SWAA. Additionally, if the planned path/trajectories fall within the constraints, at 214, control (e.g., the vehicle controller 102) uses the constraints to plan future path/trajectories for the vehicle. Control returns to 202.

If the planned path/trajectories do not fall within the constraints set by the calculated maximum achievable SWA, SWG, and SWAA, at 215, control (e.g., the motor controller 132) determines whether to revise the planned path/trajectories. If control decides not to revise the planned path/trajectories, at 216, control ends and sends an alert to the user as explained below. If, however, control decides to revise the planned path/trajectories, at 218, control revises the planned path/trajectories, and control returns to 202.

If, at 208, control (e.g., the vehicle controller 102) determines that any of the calculated maximum achievable SWA, SWG, and SWAA are inconsistent as described in detail with reference to FIGS. 6-8, then at 216, control ends and sends an alert to the user. For example, the alert can be to check if the second sensors 122 are operating correctly, if the torque curve of the motor 130 is correct, or to update the model used to estimate the rack force (explained below with reference to FIG. 3).

Figure 3:
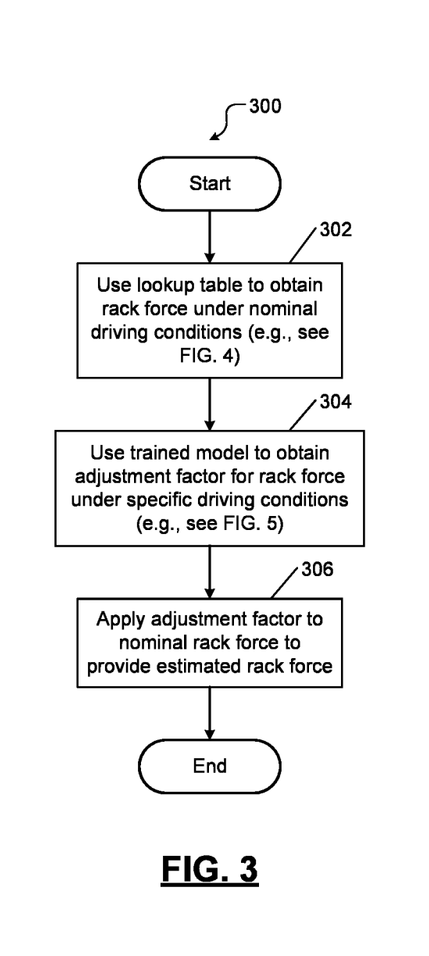
FIG. 3 shows a flowchart of a method for estimating a rack force in real-time using a lookup table and a trained model according to the present disclosure.

FIG. 3 shows a method 300 for estimating the rack force in real-time using a lookup table and a trained model (e.g., a neural network) according to the present disclosure. For example, the method 300 is performed by the vehicle controller 102. Although a data driven approach for estimating the rack force is described, other approaches combining physical models and data based models can be used as well.

At 302, control (e.g., the vehicle controller 102) uses a lookup table built offline (explained with reference to FIG. 4 below) to obtain rack force under nominal driving conditions. For example, control uses the current vehicle speed, current SWA, and current SWG to lookup the rack force. For example, control receives the current vehicle speed from one of the second sensors 122, and the current SWA and SWG from the motor controller 132.

At 304, control (e.g., the vehicle controller 102) uses a trained model such as a neural network (explained with reference to FIG. 5 below) to obtain an adjustment factor to adjust or adapt the value of the rack force under nominal driving conditions to the specific driving conditions currently present. For example, as explained below in detail with reference to FIG. 5, the model can be trained to provide the adjustment factor based on a variety of factors. For example, the factors can include parameters associated with driving conditions such as but not limited to tire pressure, ambient temperature, front axle load, road surface mu (coefficient of friction), and so on received from the second sensors 122. Additionally, the factors can include current vehicle speed received from one of the second sensors 122, and the current SWA and SWG received from the motor controller 132.

At 306, control (e.g., the vehicle controller 102) applies the adjustment factor to the value of the rack force under nominal driving conditions to estimate the rack force under the specific driving conditions currently present. This estimation of the rack force is referenced at 204 in FIG. 2, and this estimated rack force is used at 206 in FIG. 2.

Figure 4:
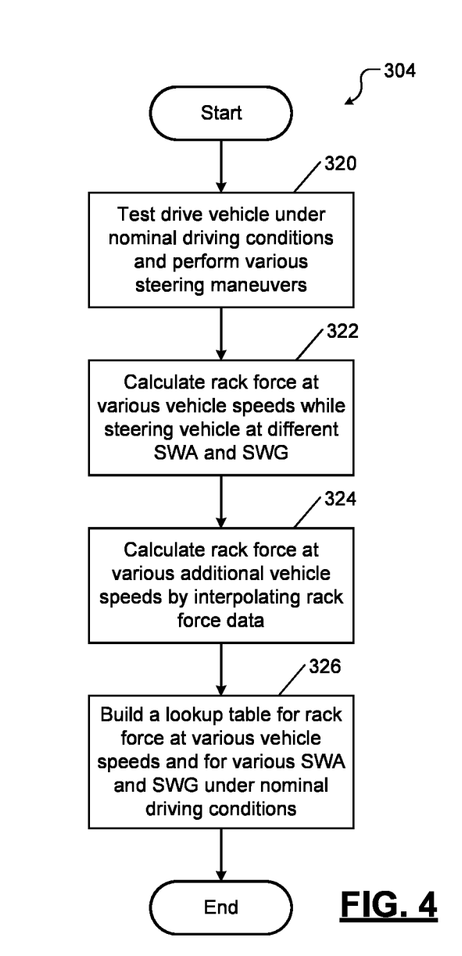
FIG. 4 shows a flowchart of a method for building the lookup table by calculating a rack force under normal driving conditions according to the present disclosure.

FIG. 4 shows a method for building the lookup table referenced at 302 in FIG. 3. The method builds the lookup table by measuring a rack force by test driving a vehicle and performing various steering maneuvers at different speeds under normal driving conditions. For example, the method measures a first set of rack forces at a first set of vehicle speeds and a first set of steering data (i.e., SWA and SWG values). The method estimates a second set of rack forces for a second set of vehicle speeds and a second set of steering data (i.e., SWA and SWG values) by interpolating the first set of rack forces. The method generates the lookup table including the first and second sets of rack forces generated for the first and second sets of vehicle speeds and the first and second sets of steering data (i.e., SWA and SWG values).

In use (i.e., at run time referenced at 302 in FIG. 3), the lookup table can provide the rack force under nominal driving conditions based on current vehicle speed and current steering data (i.e., current SWA and SWG values) in real-time. For example, the method is performed by the vehicle controller 102.

At 320, a vehicle is test driven under nominal driving conditions, and various steering maneuvers are performed at different vehicle speeds. At 322, control (e.g., the vehicle controller 102) calculates rack force at various vehicle speeds while the vehicle is steered at different SWA and SWG. For example, control receives vehicle speed from one of the second sensors 122 and receives SWA and SWG from the motor controller 132.

At 324, control (e.g., the vehicle controller 102) interpolates the rack force data and calculates rack force at various additional vehicle speeds and various other steering data (i.e., SWA and SWG values), which are not achieved during the test drive but can be experienced in actual use (i.e., in actual driving conditions). At 326, control (e.g., the vehicle controller 102) builds a lookup table with rack force for various SWA and SWG values at different vehicle speeds under nominal driving conditions. In use, (i.e., at run time referenced at 302 in FIG. 3), the current vehicle speed and the current values of the steering data (e.g., SWA and SWG) are input to the lookup table. The lookup table outputs a corresponding rack force value under nominal driving conditions.

Figure 5:
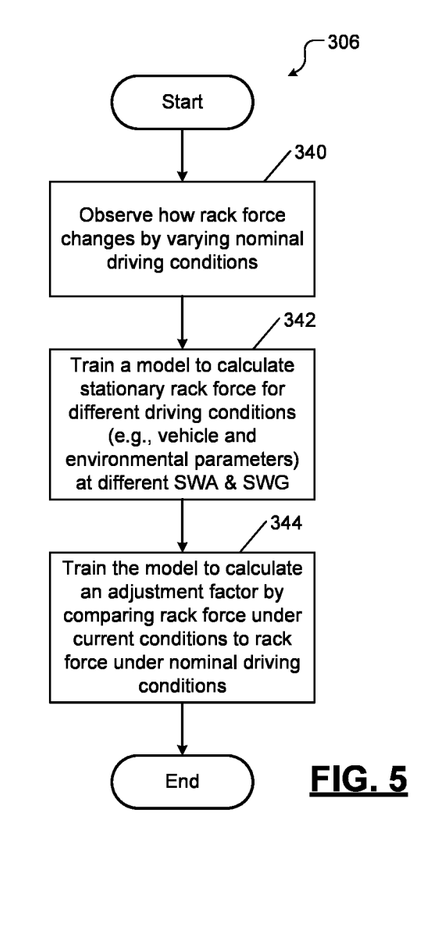
FIG. 5 shows a method of training the model for providing an adjustment factor that can be applied to the rack force calculated under normal conditions to estimate the rack force in real-time according to the present disclosure.

FIG. 5 shows a method of training a model such as a neural network for providing an adjustment factor according to the present disclosure. The adjustment factor can be applied to the rack force calculated under normal conditions to estimate the rack force under the specific driving conditions present in real-time. The model can include a neural network, a machine learning model, a lookup table, a physics based model, or any other model. The model is trained to learn how the rack force changes when driving conditions change from nominal driving conditions.

In use (i.e., at run time referenced at 304 in FIG. 3), the trained model can receive data about the vehicle's current specific driving conditions and can provide a multiplier (i.e., an adjustment factor) for the current specific driving conditions. For example, the data can include tire pressure, ambient temperature, front axle load, road surface mu (coefficient of friction), and so on received from the second sensors 122. Additionally, the data can include current vehicle speed received from one of the second sensors 122, and the current SWA and SWG received from the motor controller 132. The multiplier can be used (e.g., at 306 in FIG. 3) to adjust the rack force under nominal driving conditions (e.g., obtained from the lookup table at 302) to provide the rack force under the vehicle's current specific driving conditions. For example, the method is performed by the vehicle controller 102.

At 340, control (e.g., the vehicle controller 102) observes how rack force changes when nominal driving conditions vary. For example, control observes how rack force changes by varying factors that can change the rack force during use. For example, the factors can include (but are not limited to) the front axle load, the ambient temperature, etc.

At 342, control (e.g., the vehicle controller 102) trains a model to calculate a stationary rack force for different driving conditions (e.g., for different driving and environmental parameters) at different SWA and SWG. For example, the driving and environmental parameters can include (but are not limited to) tire pressure, ambient temperature, front axle load, road surface mu (coefficient of friction), and so on.

At 344, control (e.g., the vehicle controller 102) trains the model to calculate an adjustment factor (e.g., a multiplier) by comparing the stationary rack force calculated under current driving conditions to the stationary rack force under nominal driving conditions. In use (e.g., at 306 in FIG. 3), the current driving and environmental parameters and the current values of the steering data (e.g., SWA and SWG) are input to the trained model. The trained model outputs a corresponding adjustment factor that can be used to multiply the rack force under nominal driving conditions (e.g., obtained from the lookup table at 302) to provide the rack force value under the current specific driving conditions. The rack force value under the current specific driving conditions thus obtained is then used as the estimated rack force at 206.

Figure 6:
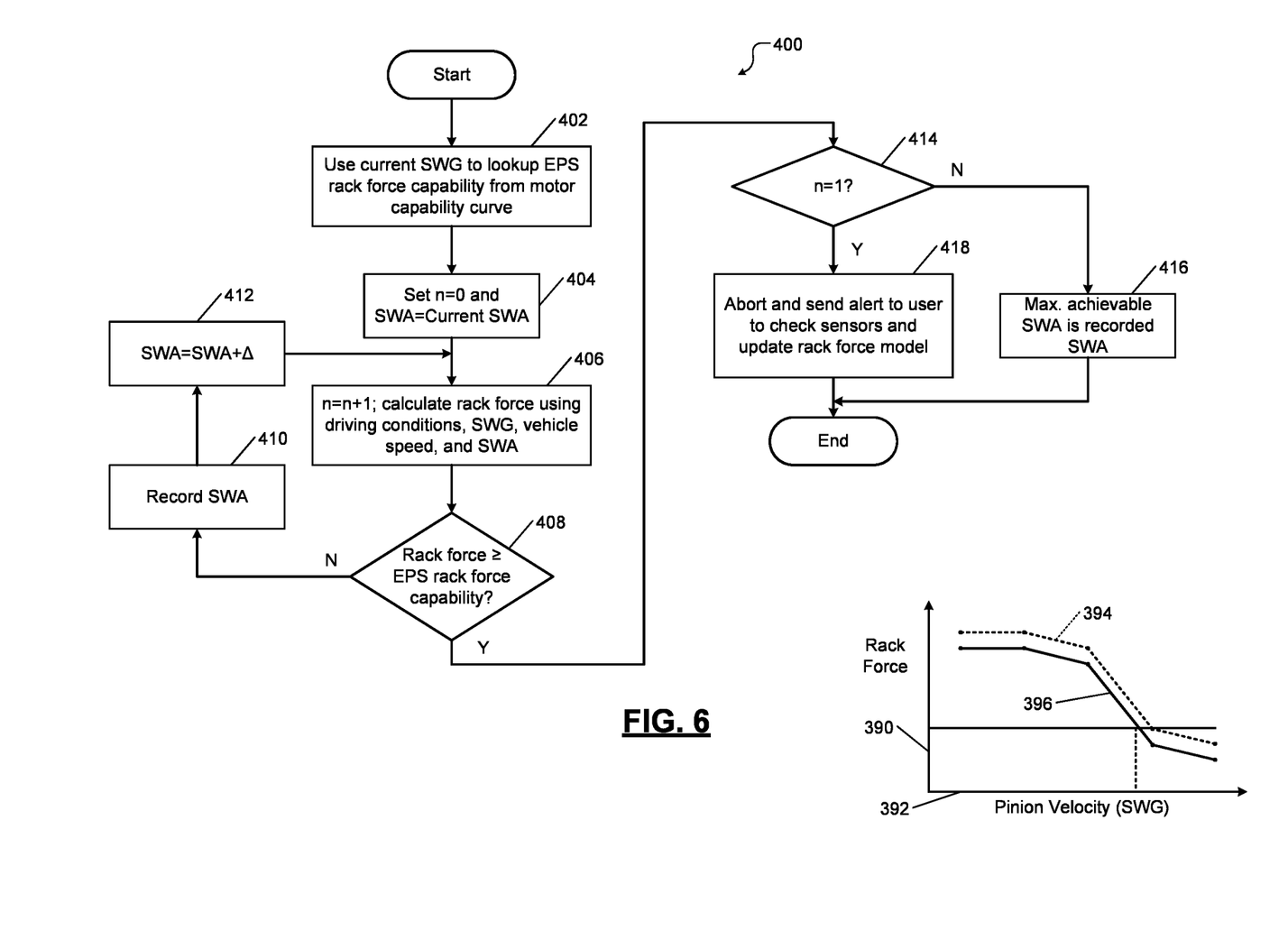
FIG. 6 shows a flowchart of a method for calculating a maximum achievable steering wheel angle (SWA) in real-time according to the present disclosure.
Figure 7:
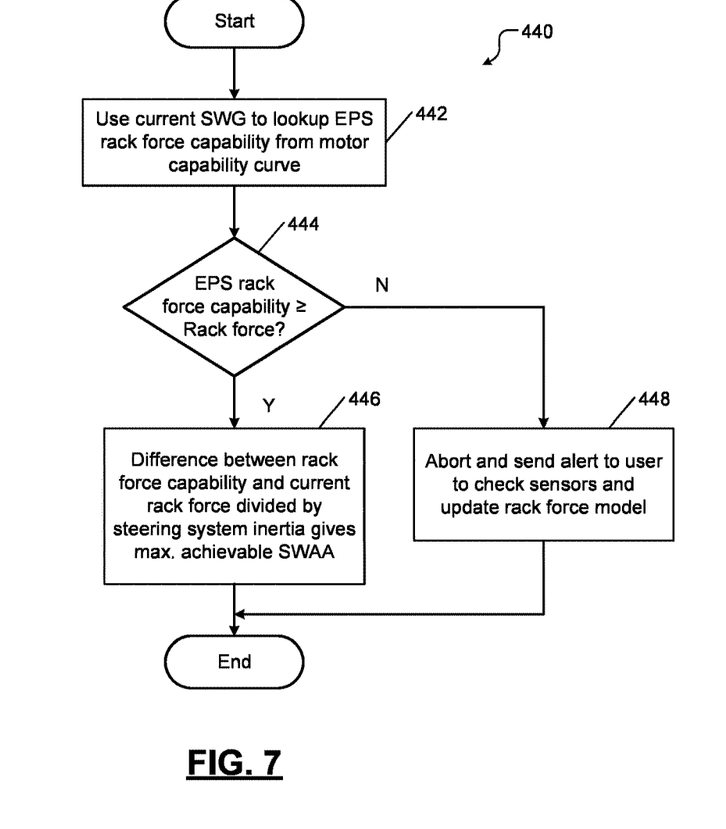
FIG. 7 shows a flowchart of a method for calculating a maximum achievable steering wheel angle acceleration (SWAA) in real-time according to the present disclosure.
Figure 8:
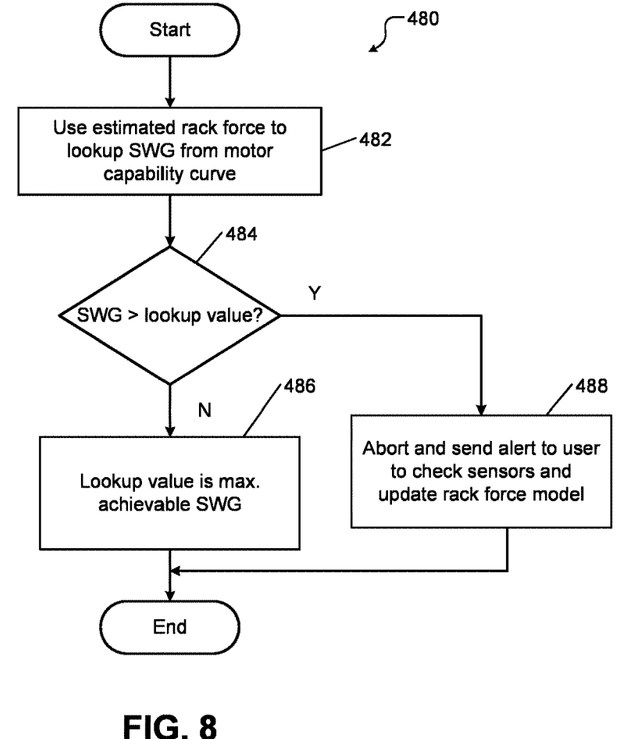
FIG. 8 shows a flowchart of a method for calculating a maximum achievable steering wheel gradient (SWG) in real-time according to the present disclosure.

FIGS. 6-8 respectively show and describe methods for calculating in real time the maximum achievable steering wheel angle (SWA), steering wheel angle gradient (SWG), and steering wheel angle acceleration (SWAA) based on the estimated rack force and health-based motor capabilities. These figures also show and describe determining if any of the calculated maximum achievable SWA, SWG, and SWAA are inconsistent (i.e., incompatible with the corresponding requirements of the planned path which include current values for SWA, SWG, and SWAA). The maximum achievable SWA, SWG, and SWAA are calculated for the purpose of determining maneuverability available to the vehicle controller 102 in path planning. That is, based on the calculated maximum achievable SWA, SWG, and SWAA, the vehicle controller 102 can determine if a planned path can be executed by the steering system 104.

FIG. 6 shows a method 400 for calculating a maximum achievable steering wheel angle (SWA) in real-time based on the estimated rack force and the health-based motor capabilities according to the present disclosure. For example, the vehicle controller 102 performs the method 400.

FIG. 6 also shows a graph of rack force plotted on the Y-axis 390 versus pinion velocity or SWG plotted on the X-axis 392. The graph, which is output by the motor health estimator 114, shows the rack force capability of the motor 130 in terms of the motor's torque capability (output) as a function of SWG (input). The graph shows a shift in the rack force capability based on temperature, for example. Other factors such as aging (magnetic field weakening) of the motor 130 can also cause a shift in the rack force capability. The graph shows a first curve 394 plotted using dotted lines showing variation of the rack force relative to SWG at a relatively lower temperature. The graph shows a second curve 396 plotted using solid lines showing variation of the rack force relative to SWG at a relatively higher temperature. This graph is referenced in the following description of FIGS. 6-8.

At 402, control (e.g., the vehicle controller 102) uses current SWG to lookup EPS rack force capability from the graph. At 404, control sets a count n to zero (i.e., n=0) and sets SWA to current SWA (i.e., SWA=Current SWA). To calculate maximum achievable SWA (in order to determine whether a larger SWA can be achieved for the purpose of having greater maneuverability), control (e.g., the vehicle controller 102) increments SWA as follows until the rack force is greater than or equal to the EPS rack force capability.

At 406, control (e.g., the vehicle controller 102) increments the count n by 1 (i.e., n=n+1). Control calculates the rack force using driving conditions, SWG, vehicle speed, and SWA value. At 408, control (e.g., the vehicle controller 102) determines if the rack force is greater than or equal to the EPS rack force capability from the graph. If the rack force is less than the EPS rack force capability, at 410, control (e.g., the vehicle controller 102) records (i.e., stores) the SWA. At 412, control (e.g., the vehicle controller 102) increments the SWA by a predetermined small value Δ (e.g., SWA=SWA+Δ), and control returns to 406. Control repeats the loop 406, 408, 410, 412 until the rack force becomes greater than or equal to (i.e., matches) the EPS rack force capability.

If the rack force is greater than or equal to the EPS rack force capability, at 414, control (e.g., the vehicle controller 102) checks if n=1. If n is not equal to 1, at 416, control (e.g., the vehicle controller 102) determines that the maximum achievable SWA is the last recorded SWA, and control ends. If n=1, which means that the calculated rack force cannot sustain current SWA (which is an inconsistency), at 418, control (e.g., the vehicle controller 102) sends an alert to the user. For example, the alert can be to check if the second sensors 122 are operating correctly, if the torque curve of the motor 130 is correct, or to update the model used to estimate the rack force (explained above with reference to FIG. 3), and control ends.

FIG. 7 shows a method 440 for calculating a maximum achievable steering wheel angle acceleration (SWAA) in real-time based on the estimated rack force and the health-based motor capabilities according to the present disclosure. For example, the vehicle controller 102 performs the method 440.

At 442, control (e.g., the vehicle controller 102) uses current SWG to lookup EPS rack force capability from the graph shown in FIG. 6. To calculate maximum achievable SWAA, at 444, control (e.g., the vehicle controller 102) determines if the EPS rack force capability from the graph is greater than or equal to the current rack force. If the EPS rack force capability is greater than or equal to the current rack force, at 446, control (e.g., the vehicle controller 102) calculates a difference between the EPS rack force capability and the current rack force. Control divides the difference by the inertia of the steering system 104 to determine the maximum achievable SWAA, and control ends.

If the EPS rack force capability is less than the current rack force, at 448, control (e.g., the vehicle controller 102) detects the anomaly and sends an alert to the user. For example, the alert can be to check if the second sensors 122 are operating correctly, if the torque curve of the motor 130 is correct, or to update the model used to estimate the rack force (explained above with reference to FIG. 3), and control ends.

FIG. 8 shows a method 480 for calculating a maximum achievable steering wheel gradient (SWG) in real-time based on the estimated rack force and the health-based motor capabilities according to the present disclosure. For example, the vehicle controller 102 performs the method 480.

Since rack force capability is a function of SWG, at 482, control (e.g., the vehicle controller 102) uses current rack force to look up SWG from the motor capability curve (e.g., see an example of an intercept shown in the graph in FIG. 6). To calculate maximum achievable SWG, at 484, control (e.g., the vehicle controller 102) determines if the current SWG is greater than the looked up SWG. If the current SWG is less than or equal to the looked up SWG, at 486, control (e.g., the vehicle controller 102) determines that the looked up SWG is the maximum achievable SWG, and control ends.

If the current SWG is greater than the looked up SWG, at 488, control (e.g., the vehicle controller 102) detects the anomaly and sends an alert to the user. For example, the alert can be to check if the second sensors 122 are operating correctly, if the torque curve of the motor 130 is correct, or to update the model used to estimate the rack force (explained above with reference to FIG. 3), and control ends.

Figure 9:
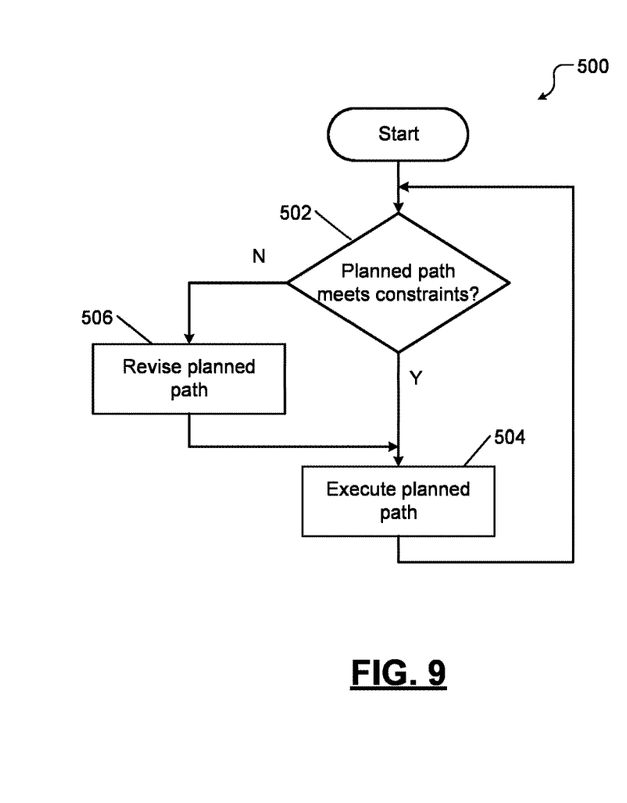
FIG. 9 shows a flowchart of a method for checking a planned path trajectory in real-time according to the present disclosure.

FIG. 9 shows a method 500 for checking (i.e., verifying feasibility of) a planned path trajectory in real-time according to the present disclosure. For example, the vehicle controller 102 and the motor controller 132 perform the method 500. At 502, control (e.g., the vehicle controller 102) determines if the planned path meets the constraints (i.e., whether the SWA, SWG, and SWAA for the planned path are less than or equal to the calculated maximum achievable SWA, SWG, and SWAA). If the planned path meets the constraints, at 504, (e.g., the motor controller 132) executes the planned path, and control returns to 502. If the planned path does not meet the constraints, at 506, control (e.g., the vehicle controller 102) revises (i.e., adjusts) the planned path, and control proceeds to 504.

Figure 10:
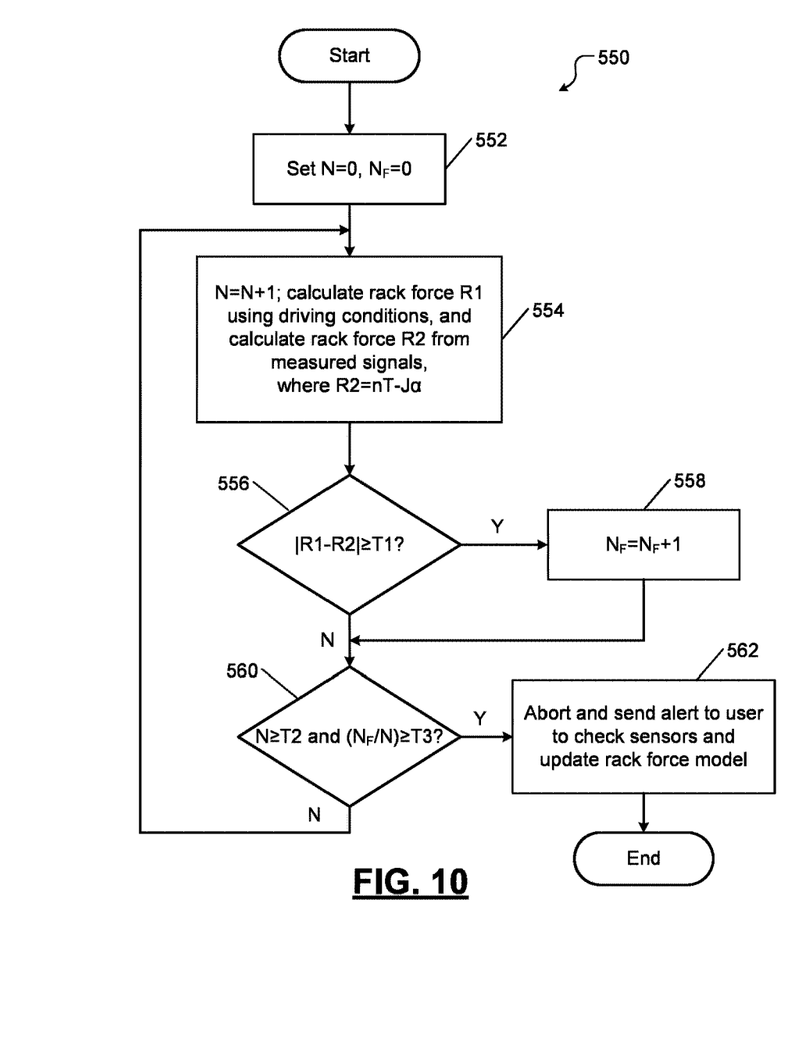
FIG. 10 shows a flowchart of a method for checking the accuracy of the rack force estimation according to the present disclosure.

FIG. 10 shows a method 550 for checking the accuracy of the rack force estimation post hoc according to the present disclosure. For example, the vehicle controller 102 performs the method 550 to determine how accurate was the rack force estimate (e.g., at 204 in FIG. 2) and if the model needs to be further trained based on the accuracy determination. For example, the vehicle controller 102 performs the method 550.

At 552, control (e.g., the vehicle controller 102) sets counts $N=0$, and $N_F=0$. At 554, control increments N (i.e., $N=N+1$). Control calculates rack force R1 using driving conditions that were used to estimate the rack force. Control calculates rack force R2 from actual measured signals using the equation $R2=nT-J\alpha$, where n is a ratio converting EPS torque output to force applied to the rack, T is a torque output of the steering system 104, J is the inertia of the steering system 104, and a is the SWAA determined by processing SWG (e.g., by taking a derivative of SWG).

At 556, control determines if the difference between R1 and R2 is greater than or equal to a first threshold T1. Control proceeds to 560 if the difference between R1 and R2 is less than the first threshold T1. If the difference between R1 and R2 is greater than or equal to a first predetermined threshold T1, at 558, control increments $N_F$ (i.e., $N_F=N_F+1$), and control proceeds to 560.

At 560, control determines if N is greater than or equal to a second predetermined threshold T2 and a ratio $N_F/N$ is greater than or equal to a third predetermined threshold T3. Control returns to 554 if N is less than the second predetermined threshold T2 and the ratio $N_F/N$ is less than the third predetermined threshold T3. If N is greater than or equal to the second predetermined threshold T2 and a ratio $N_F/N$ is greater than or equal to the third predetermined threshold T3, at 562, control (e.g., the vehicle controller 102) sends an alert to the user. For example, the alert can be to check if the second sensors 122 are operating correctly, if the torque curve of the motor 130 is correct, or to update the model used to estimate the rack force (explained above with reference to FIG. 3), and control ends. The first, second, and third predetermined thresholds T1, T2, and T3 can be calibrated.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a processor; and
a memory storing instructions which when executed by the processor configure the processor to:
estimate a rack force for a steering system of a vehicle based on current driving and environmental conditions using a model;
estimate a health of an actuator of the steering system of the vehicle;
estimate maximum achievable angle, velocity, and acceleration for the actuator of the steering system based on the estimated rack force and the estimated health of the actuator;
provide to the steering system a path planned for the vehicle based on the estimated maximum achievable angle, velocity, and acceleration for the actuator of the steering system;
cause the steering system to execute the path in response to an angle, a velocity, and an acceleration for executing the path being within the estimated maximum achievable angle, velocity, and acceleration;
calculate, using a different method than that used by the model, a first rack force based on driving and environmental conditions used by the model to estimate the rack force;
calculate a second rack force based on actual measurements of parameters of the steering system of the vehicle;
verify accuracy of the estimated rack force based the first and second rack forces; and
update the model used to estimate the rack force based on the accuracy.

2. The system of claim 1 wherein the instructions configure the processor to provide the path to the steering system in response to an angle, a velocity, and an acceleration for executing the path being within the estimated maximum achievable angle, velocity, and acceleration.

3. The system of claim 1 wherein before providing the path to the steering system, the instructions configure the processor to modify the path to bring an angle, a velocity, and an acceleration for the actuator in conformity with the estimated maximum achievable angle, velocity, and acceleration.

4. The system of claim 1 wherein the instructions configure the processor to provide an indication based on the accuracy to check one or more sensors.

5. The system of claim 1 wherein the instructions configure the processor to:
obtain a first value for the rack force from a lookup table based on the nominal driving and environmental conditions;
obtain an adjustment factor from the model based on the current driving and environmental conditions; and
estimate the rack force by multiplying the first value for the rack force by the adjustment factor.

6. The system of claim 5 wherein the instructions configure the processor to:
calculate a first set of rack forces at a first set of vehicle speeds and a first set of steering data;
estimate a second set of rack forces for a second set of vehicle speeds and a second set of steering data by interpolating the first set of rack forces; and
generate the lookup table including the first and second sets of vehicle speeds.

7. The system of claim 5 wherein the instructions configure the processor to train the model to:
calculate rack forces at different driving and environmental conditions; and
generate the adjustment factor by comparing the first rack force calculated at the current driving and environmental conditions to a third rack force calculated at the nominal driving and environmental conditions.

8. A method comprising:
estimating a rack force for a steering system of a vehicle based on current driving and environmental conditions using a model;
estimating a health of an actuator of the steering system of the vehicle;
estimating maximum achievable angle, velocity, and acceleration for the actuator of the steering system based on the estimated rack force and the estimated health of the actuator;
providing to the steering system a path planned for the vehicle based on the estimated maximum achievable angle, velocity, and acceleration for the actuator of the steering system;
executing the path using the steering system in response to an angle, a velocity, and an acceleration for executing the path being within the estimated maximum achievable angle, velocity, and acceleration;
calculate, using a different method than that used by the model, a first rack force based on driving and environmental conditions used by the model to estimate the rack force;
calculate a second rack force based on actual measurements of parameters of the steering system of the vehicle;
verify accuracy of the estimated rack force based the first and second rack forces; and
update the model used to estimate the rack force based on the accuracy.

9. The method of claim 8 further comprising providing the path to the steering system in response to an angle, a velocity, and an acceleration for executing the path being within the estimated maximum achievable angle, velocity, and acceleration.

10. The method of claim 8 further comprising before providing the path to the steering system, modify the path to bring an angle, a velocity, and an acceleration for the actuator in conformity with the estimated maximum achievable angle, velocity, and acceleration.

11. The method of claim 8 further comprising providing an indication based on the accuracy to check one or more sensors.

12. The method of claim 8 further comprising:
obtaining a first value for the rack force from a lookup table based on nominal driving and environmental conditions;
obtaining an adjustment factor from the model based on the current driving and environmental conditions; and
estimating the rack force by multiplying the first value for the rack force by the adjustment factor.

13. The method of claim 12 further comprising:
calculating a first set of rack forces at a first set of vehicle speeds and a first set of steering data;
estimating a second set of rack forces for a second set of vehicle speeds and a second set of steering data by interpolating the first set of rack forces; and
generating the lookup table including the first and second sets of vehicle speeds.

14. The method of claim 12 further comprising training the model to:
calculate rack forces at different driving and environmental conditions; and
generate the adjustment factor by comparing the first rack force calculated at the current driving and environmental conditions to a third rack force calculated at the nominal driving and environmental conditions.

* * * * *